US008417216B2

(12) United States Patent
Sullivan, Jr. et al.

(10) Patent No.: US 8,417,216 B2
(45) Date of Patent: *Apr. 9, 2013

(54) ANONYMOUS ELECTRONIC TRANSACTIONS

(75) Inventors: Robert R. Sullivan, Jr., Pleasanton, CA (US); David W. Aucsmith, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 906 days.

This patent is subject to a terminal disclaimer.

(21) Appl. No.: 11/736,427

(22) Filed: Apr. 17, 2007

(65) Prior Publication Data

US 2007/0184830 A1 Aug. 9, 2007

Related U.S. Application Data

(63) Continuation of application No. 09/751,322, filed on Dec. 29, 2000, now Pat. No. 7,242,921.

(51) Int. Cl.
*H04Q 7/20* (2006.01)

(52) U.S. Cl.
USPC .................................... 455/410; 705/26

(58) Field of Classification Search .................. 455/409, 455/406, 410, 405; 705/26, 35, 5, 14
See application file for complete search history.

(56) References Cited

U.S. PATENT DOCUMENTS

| | | | |
|---|---|---|---|
| 5,583,918 A | 12/1996 | Nakagawa | |
| 5,822,737 A * | 10/1998 | Ogram | 705/26 |
| 5,896,499 A | 4/1999 | McKelvey | |
| 5,963,917 A * | 10/1999 | Ogram | 705/26 |
| 6,151,588 A * | 11/2000 | Tozzoli et al. | 705/37 |
| 6,370,514 B1 * | 4/2002 | Messner | 705/14 |
| 6,516,996 B1 | 2/2003 | Hippeläinen | |
| 6,646,659 B1 | 11/2003 | Brown et al. | |
| 7,203,315 B1 * | 4/2007 | Livesay | 380/255 |
| 7,308,426 B1 * | 12/2007 | Pitroda | 705/35 |
| 7,366,695 B1 * | 4/2008 | Allen-Rouman et al. | 705/39 |
| 2002/0023006 A1 * | 2/2002 | Partos et al. | 705/26 |
| 2002/0035538 A1 | 3/2002 | Moreau | |
| 2002/0069114 A1 | 6/2002 | Charette et al. | |

(Continued)

FOREIGN PATENT DOCUMENTS

| | | |
|---|---|---|
| EP | 0 965 902 | 12/1999 |
| JP | 10-074221 | 3/1998 |

(Continued)

OTHER PUBLICATIONS

Certified translation of Japanese Publication No. 10-074221.

(Continued)

*Primary Examiner* — Patrick Edouard
*Assistant Examiner* — Myron K Wyche
(74) *Attorney, Agent, or Firm* — Joni D. Stutman (57) ABSTRACT

Techniques are disclosed for protecting privacy of parties to electronic transactions, such as transactions conducted through a GSM network. An anonymity service provider receives orders directed from its subscriber to a recipient for goods or services, along with information about its subscriber. The anonymity service provider relays the order to the recipient but withholds information about the subscriber, as the subscriber directs. The recipient receives payment for the good or service by way of a voucher from the anonymity service provider.

28 Claims, 6 Drawing Sheets

U.S. PATENT DOCUMENTS

2002/0069166 A1 6/2002 Moreau et al.
2002/0086660 A1 7/2002 Sullivan et al.
2004/0198373 A1 10/2004 Ford et al.

FOREIGN PATENT DOCUMENTS

| KR | 2000-0068469 | 11/2000 |
| WO | WO 96/13814 | 5/1996 |
| WO | WO 98/10361 | 3/1998 |
| WO | WO 00/65517 | 11/2000 |
| WO | WO 00/67178 | 11/2000 |
| WO | WO02/054321 | 7/2002 |

OTHER PUBLICATIONS

Communication issued in related European Patent Application, pp. 8.
International Preliminary Report on Patentability for PCT Patent Application No. PCT/US2001/50662, completed on Jul. 20, 2005, 4 pages.

* cited by examiner

ANONYMOUS ELECTRONIC TRANSACTIONS

CROSS-REFERENCE TO RELATED APPLICATIONS

This application is a continuation application of and claims priority to U.S. patent application Ser. No. 09/751,322, filed Dec. 29, 2000. The disclosure of the prior application is considered part of (and is incorporated by reference in) the disclosure of this application.

BACKGROUND

GSM originally stood for Groupe Spécial Mobile, a European study group formed in 1982 to study and develop criteria for a pan-European mobile telephone system. GSM is currently recognized as an acronym for Global System for Mobile communications, and represents the criteria developed as a result of the work of the Groupe Spécial Mobile. In general, GSM represents a set of mobile telephone standards and specifications. Equipment that meets GSM standards in one GSM network is compatible with any GSM network. GSM networks now exist worldwide.

DETAILED DESCRIPTION

The techniques described below allow network subscribers to conduct electronic transactions with providers of goods and services, while maintaining a degree of personal privacy. The techniques are especially advantageous in the context of a GSM network, but are not limited to GSM.

GSM systems are digital systems that employ time division multiple access technology, allowing several subscribers to share a frequency channel at the same time. GSM systems are intended to interface with digital communication networks such as the Integrated Services Digital Network (ISDN). GSM systems are also intended to work with analog communication systems, such as the Public Switched Telephone Network (PSTN).

Figure 1:
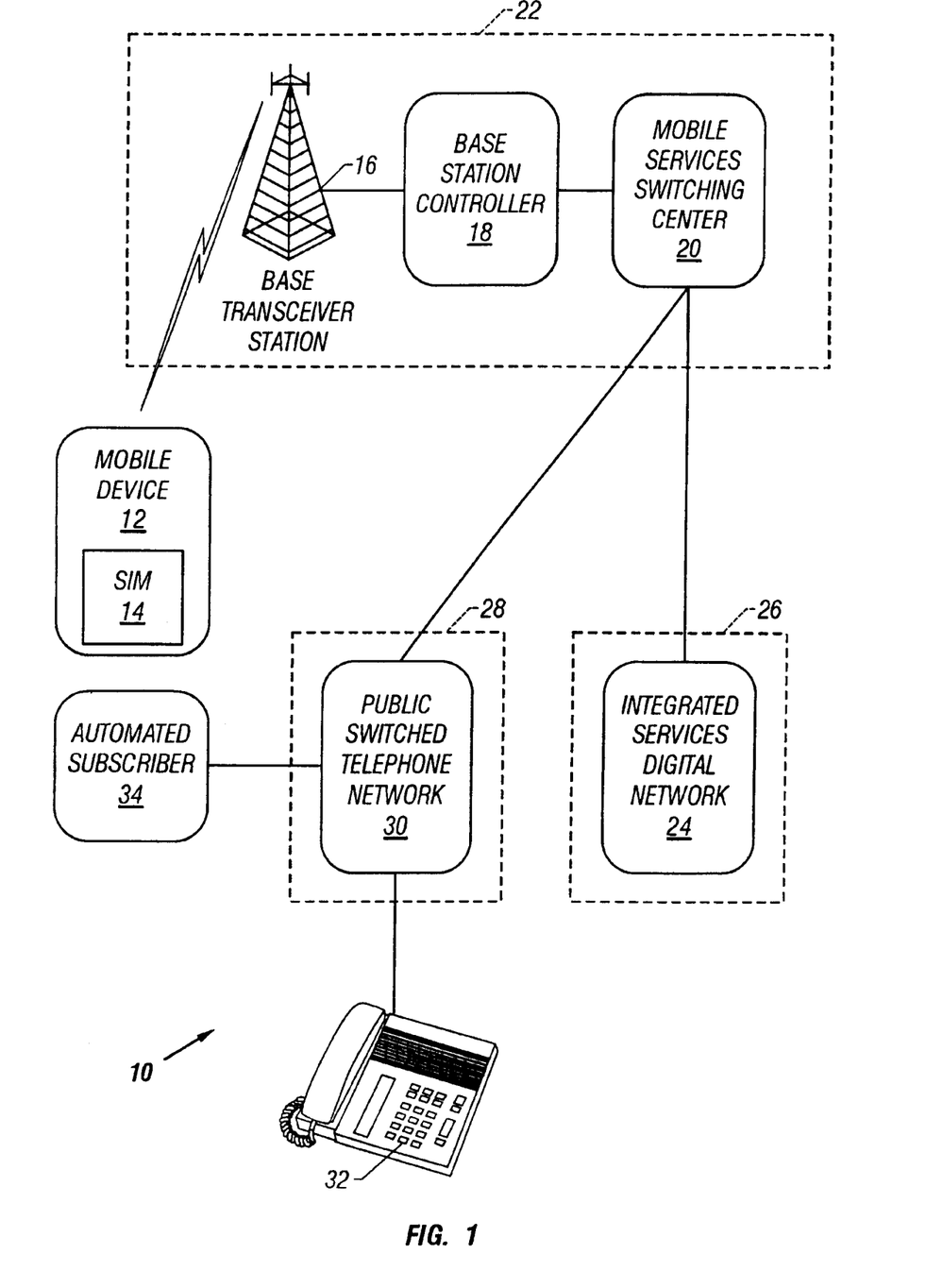
FIG. 1 is a diagram of a communications network.

FIG. 1 shows a typical communications network 10 that includes GSM systems. A subscriber obtains wireless access to network 10 via mobile device 12. Mobile device 12 may be any kind of terminal that accesses network 10, such as a mobile telephone handset. Mobile device 12 typically is assigned a unique International Mobile device Identity, which identifies each piece of mobile device 12 to network 10. In addition, mobile device 12 interfaces with Subscriber Identity Module (SIM) 14, which uniquely identifies the subscriber to network 10. A typical SIM 14 is a smart card that is inserted into a GSM terminal. The subscriber can make and receive calls with mobile device 12.

Mobile device 12 accesses network 10 by establishing a wireless communication link with a base transceiver station 16. Base transceiver station 16 includes a transceiver that defines a cellular calling area. Base transceiver station 16 typically handles the wireless protocols with mobile device 12. A plurality of base station transceivers are generally managed by a base station controller 18. A plurality of base station controllers is usually coupled to a mobile services switching center 20, which typically acts as a central component in the cellular network. Base transceiver station 16, base station controller 18 and mobile services switching center 20 are typically operated under the auspices of a GSM provider 22.

Mobile services switching center 20 interfaces with other communication services, such as ISDN 24 and PSTN 30, each of which may be operated under the auspices of different communications suppliers 26, 28. ISDN 24 and PSTN 30 provide service to subscribers such as telephone customers 32. In addition, ISDN 24 and PSTN 30 may each connect to automated subscribers 34, such as computers, copying machines, toll booths or vending machines. Toll booths and vending machines, for example, may dispense services or goods when provided with a signal authorizing them to do so.

In typical network 10, a subscriber can use mobile device 12 to place an electronic order for goods or services. This transaction may be processed in several ways, such as by accessing an account or authorizing payment by credit card. One method for processing the transaction is to use subscriber data stored in SIM 14. Invoices can then be billed to the subscriber's account with GSM provider 22. Typically the entity receiving the order learns personal information from the subscriber's SIM 14 and mobile device 12, such as the subscriber's identity, location or calling pattern. In exchange for the simplicity of making an electronic transactional order for goods or services, subscribers may be giving up some of their privacy. The techniques described below allow GSM subscribers to preserve their privacy while making electronic transactional orders for goods and services.

Figure 2:
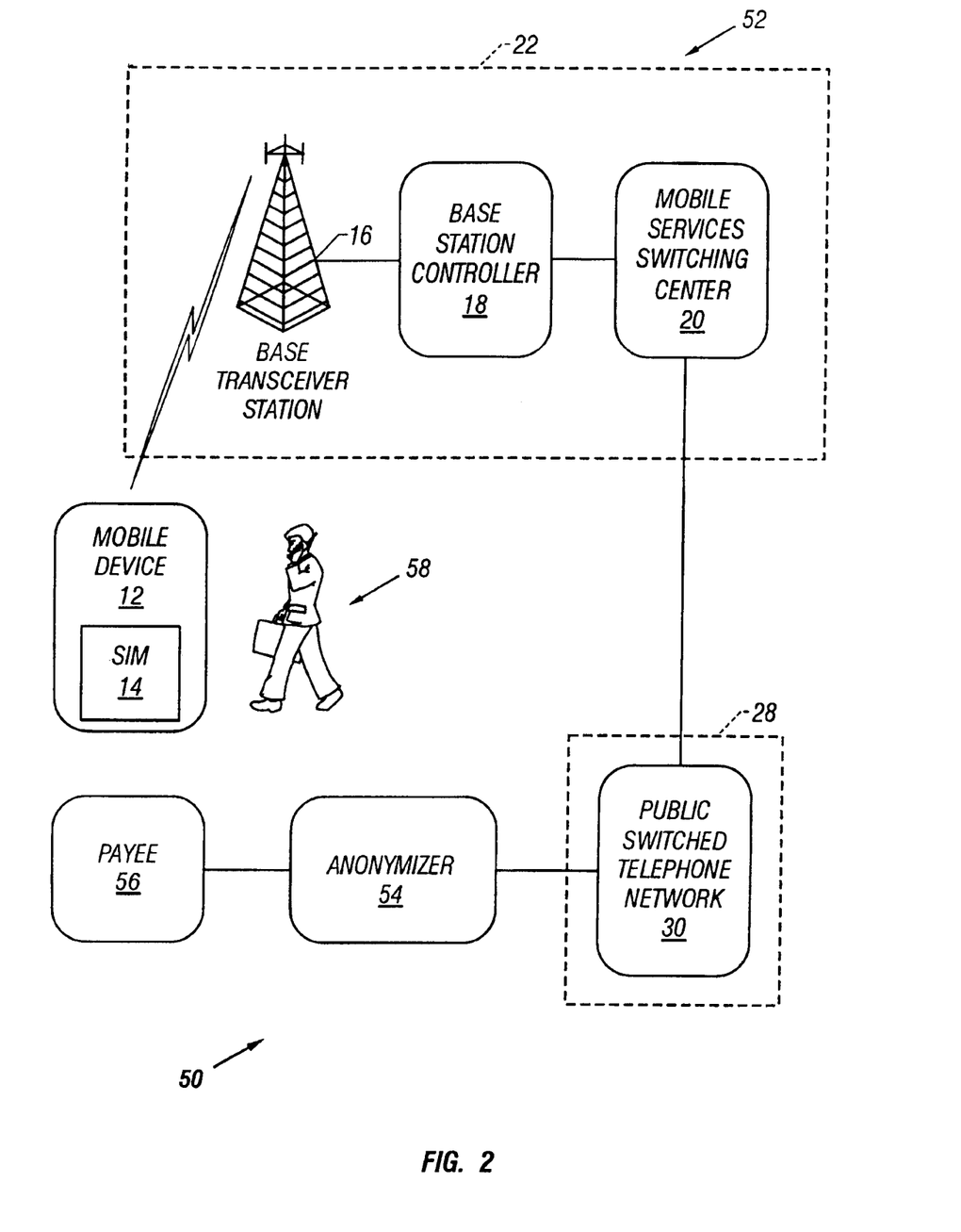
FIG. 2 is a diagram of a communications network including an anonymizer.

FIG. 2 shows a communications network 50 that includes a GSM system 52. Unlike network 10 of FIG. 1, network 50 of FIG. 2 includes an element 54 to be called herein an "anonymizer," because it provides anonymity service. In FIG. 2, anonymizer 54 provides anonymity service to GSM subscribers using network 50. Network 50 of FIG. 2 also includes a payee 56, which may be an automated subscriber like automated subscriber 34 in FIG. 1. A GSM user 58 who subscribes to the anonymity service provided by anonymizer 54 interfaces with network 50 via an interface such as mobile device 12. Payee 56 interfaces with network by way of an interface such as a connection to PSTN 30.

Anonymizer 54 is shown in FIG. 2 as interposed between PSTN 30 and payee 56, but anonymizer 54 may communicate with payee 56 by way of PSTN 30, or by way of another communication channel. Furthermore, anonymizer 54 could be placed at other locations in network 50. Anonymizer 54 could be, for example, part of GSM system 52 and operated under the auspices of GSM provider 22. Anonymizer 54 may alternatively be operated under the auspices of PSTN 30 or any other communication provider. The service of anonymizer 54 may also be offered by an anonymity service provider independent of the communication network. Furthermore, anonymizer 54 is not limited to application with an analog system such as PSTN 30, but may provide anonymity in a digital system such as ISDN 24 (not shown in FIG. 2).

Subscriber 58 to the anonymity service provided by anonymizer 54 may conduct transactions by providing no personal data or by providing a selected amount of personal data. Anonymizer 54 protects the privacy of subscriber 58 by providing no personal information, or limited personal information, to payee 56.

Figure 3:
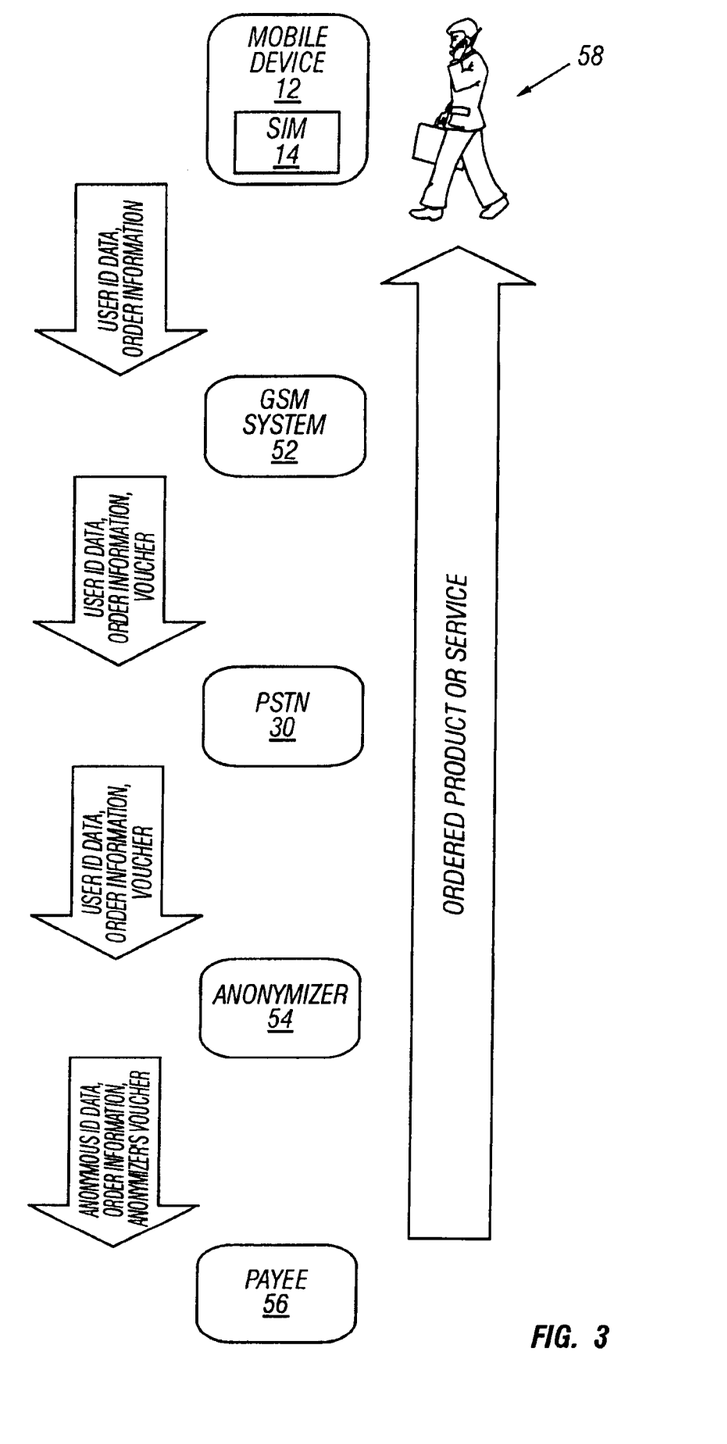
FIG. 3 is a conceptual diagram depicting the flow of data, and goods or services in an electronic transaction involving an anonymizer.

FIG. 3 illustrates an exemplary transaction using anonymizer 54. Subscriber 58 places an electronic transactional order for a good or service from payee 56, using mobile device 12. Subscriber 58 sends information that will be needed to process the order, such as the kind of service desired or the quantity of product needed. In addition, other information about subscriber 58 may be transmitted automatically, such as the name of the subscriber, the location of the call and the equipment used to make the order. This information is passed to GSM system 52, and may be relayed via PSTN 30 to anonymizer 54.

Anonymizer 54 relays the order information to payee 56 (via PSTN 30 or other communication channel), but does not relay the other information about subscriber 58. Instead, anonymizer 54 may pass along limited information about subscriber 58. The information passed along is authorized by subscriber 58. For example, anonymizer 54 may pass along an address to which delivery is requested. In addition, payee 56 may pass information to anonymizer 54 to be relayed to subscriber 58, such as a confirmation number, or a demand for additional information. Anonymizer 54 may also pass along to payee 56 personal information about subscriber 58, as will be described in more detail below. After receiving a satisfactory order, payee 56 provides the products or services to subscriber 58 or to a recipient designated by subscriber 58.

Payment for the products or services may be handled in several ways. As shown in FIG. 3, a voucher may be passed to anonymizer 54, which relays an anonymizer voucher to payee 56. In general, a voucher represents an electronic payment authorization, such as a credit or other record exchangeable for payment. The voucher transmitted by anonymizer 54 to payee 56 may also represent a guarantee of payment, such that payee 56 does not bear a risk of nonpayment for products or services delivered.

Subscriber 58 ultimately pays for the goods or services provided by payee 56, but subscriber 58 typically pays an entity other than payee 56. For example, as illustrated in FIG. 3, an arrangement between the GSM provider 22 and the anonymity service provider results in a voucher being transmitted from GSM system 52 to anonymizer 54. The bill for the goods or services may be added to the bill for GSM service sent to subscriber 58 by GSM provider 22. Alternatively, the bill for the goods or services is then to the bill sent to subscriber 58 by the anonymity service provider.

Figure 4:
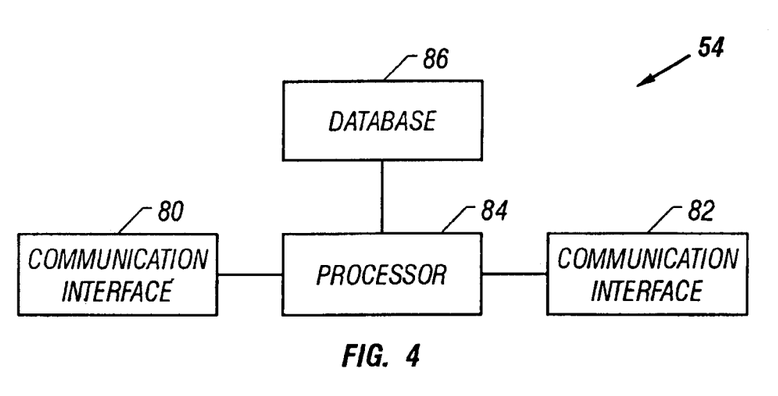
FIG. 4 is a diagram of an anonymizer.

A system diagram of anonymizer 54 is shown in FIG. 4. Anonymizer 54 includes communication interfaces 80 and 82, by which anonymizer 54 connects to PSTN 30 or ISDN 24, and by which anonymizer 54 communicates with subscriber 58 and payee 56. In some circumstances anonymizer 54 may function with a single communication interface. Anonymizer 54 also may include database 86, which stores information about subscribers, including directives as to the degree of anonymity desired by each subscriber.

Anonymizer 54 further includes processor 84, which performs several functions associated with anonymity service. For example, processor 84 retrieves information from database 86 about subscribers' desired anonymity. Processor 84 also receives subscribers' orders from one communication interface 80 and relays the orders via a second communication interface 82. In addition, processor 84 stores subscriber information in database 86. Anonymizer 54 may be implemented, for example, as a computer system. Techniques employed by anonymizer 54 may be implemented as software, which may be stored in a machine or computer system on any machine-readable medium such as a magnetic disk or optical drive, or may be stored within non-volatile memory such as read-only memory (ROM).

Figure 5:
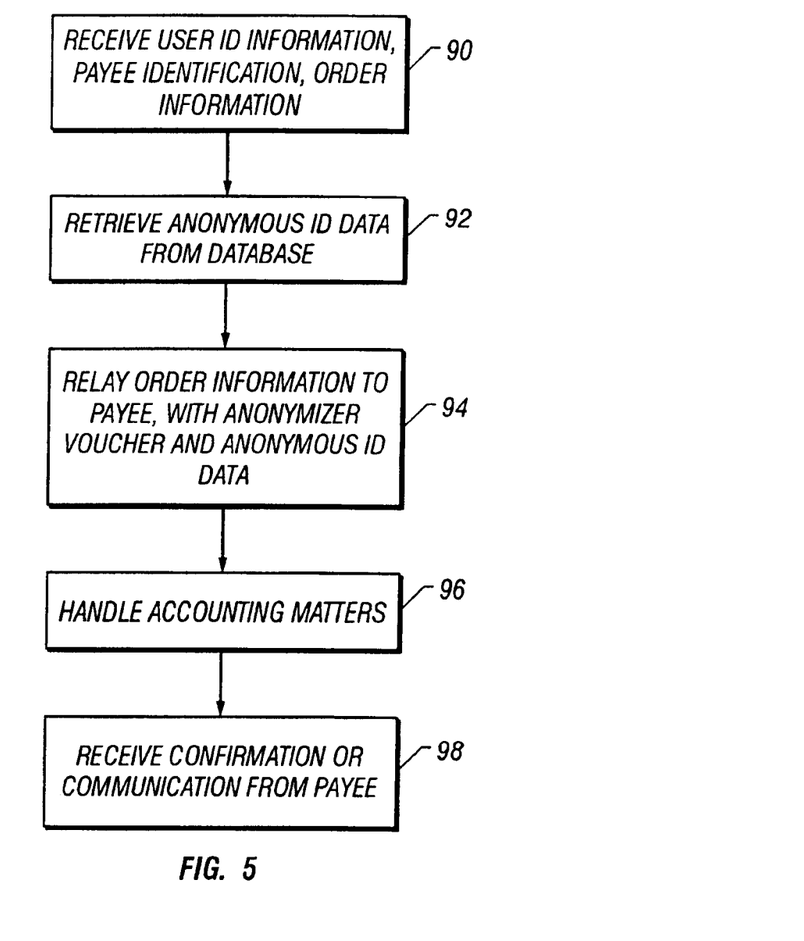
FIG. 5 is a flowchart illustrating techniques for providing anonymizer service.

FIG. 5 is a flowchart illustrating techniques for providing anonymizer service. In an exemplary configuration, anonymizer 54 receives data related to a subscriber's order, such as the identity of the payee, the product or service desired, and the quality or quantity desired (90). Anonymizer 54 also receives data identifying the subscriber (90). Anonymizer 54 retrieves from its database information about the subscriber, including, for example, the degree of privacy to be afforded the subscriber.

Several degrees of privacy may be offered, providing a range of anonymity. One degree of anonymity is total anonymity. A payee receives no personal information about a subscriber having total anonymity. The subscriber may specify a lesser degree of anonymity by allowing anonymizer 54 to relay to payee 56, for example, information about the subscriber's name but not information about the subscriber's address, telephone number or calling patterns. The subscriber may also specify that information about him be kept from payee 56, but that demographic information about him be disclosed. A subscriber may permit payee 56 to know the town where subscriber lives, for example, without disclosing the subscriber's name or address. A subscriber may also provide payee 56 with a pseudonym or a frequent-purchaser identification code. Another form of anonymity may vary on the basis of the identity of the payee. The subscriber may authorize disclosure of more personal data when ordering airplane tickets, for example, than when ordering flowers. A further form of anonymity involves "negotiated anonymity," which will be explained in more detail below.

After retrieving the information from the database (92), anonymizer 54 relays data to payee 56, such as the order and voucher information (94). Anonymizer 54 may also pass along to payee 56 anonymous identification data, i.e., data about the identity of the subscriber that the subscriber has authorized to be passed along. In addition, anonymizer 54 ordinarily processes the transaction (96), which may include debiting the subscriber's account for the voucher issued to payee 56, or acknowledging a voucher received from GSM provider 22. Anonymizer 54 may also relay information from payee 56 to the subscriber, such as a confirmation number (98).

Figure 6:
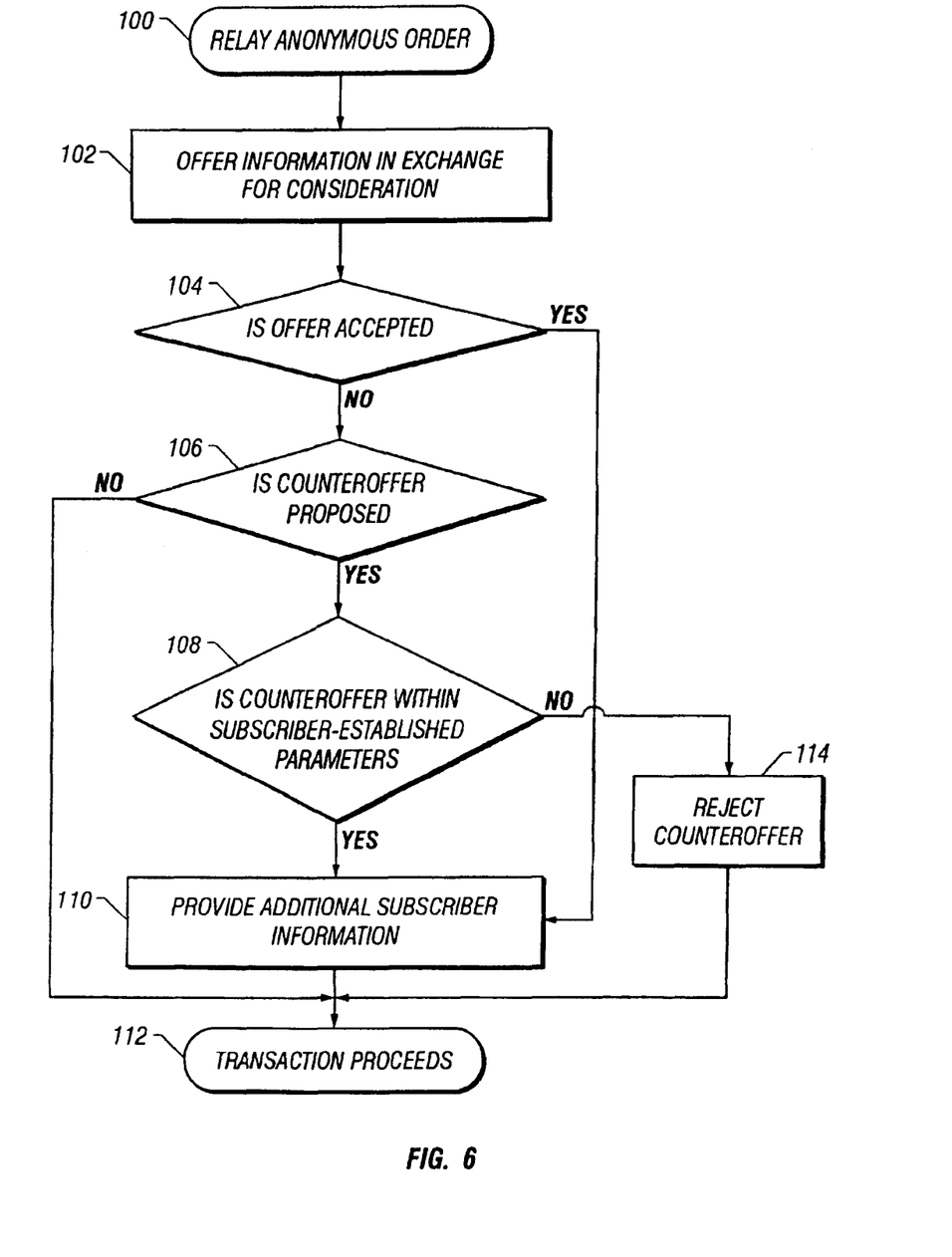
FIG. 6 is a flowchart illustrating variable anonymity.

As described above, anonymizer 54 may provide a range of anonymity. FIG. 6 is a flowchart illustrating a variable anonymity technique. In this technique, the degree of anonymity may become part of the transaction, and is automatically "negotiated" by anonymizer 54 on behalf of subscriber 58 and payee 56. Anonymizer 54 relays an anonymous order for a product or service to payee 56 (100), and includes an offer to provide additional information about subscriber 58 in exchange for consideration from payee 56, such as a discount. The offer is pre-authorized by subscriber 58. If payee 56 accepts (104), anonymizer 54 provides the additional information to payee 56 (110) and the transaction proceeds (112). Payee 56 may reject the offer and put forth a counteroffer (106). Payee's counteroffer may, for example, propose a smaller discount or request more information. Anonymizer 54 evaluates the counteroffer according to parameters previously authorized by subscriber 58, which are stored in database 86. If the counteroffer is not within the parameters, the counteroffer is rejected (114) and the transaction proceeds (112). If the counteroffer is accepted, anonymizer 54 provides the additional information to payee 56 (110) and the transaction proceeds (112).

The techniques shown in FIG. 6 are for purposes of illustration. Variations of the techniques are possible. For example, payee 56 may initiate the offer to provide the product or service at a discount if additional information is provided, and anonymizer 54 may counteroffer. Subscriber 58 may also specify a range of permissible prices, quantities or degrees of personal information, allowing further offers and counteroffers. In addition, payee 56 may refuse to accept anonymous orders, in which case its counteroffer represents a stipulation that unless certain information is provided, there will be no transaction.

A number of embodiments of the invention have been described. Although the techniques for maintaining various degrees of anonymity have been described in the context of a GSM network, they may be adapted to any network in which a subscriber wishes to avoid having personal information passed to a payee. These and other embodiments are within the scope of the following claims.

What is claimed is:

1. A method of operating an anonymizer, comprising:
receiving, over a network, from a buyer coupled to the network via a first interface, an electronic order to be placed with a payee, where the payee is coupled to the network via a second interface, the electronic order including
payee information identifying the payee with whom the electronic order is to be placed,
order information describing the item or service ordered, and
identity information regarding the buyer placing the electronic order;
removing at least some of the identity information from the electronic order by an anonymizer, wherein the anonymizer, comprises a processing means, a database for holding buyer identify information, and a communication interface, the anonymizer coupled to the network by the communication interface; and
transmitting, over the network, the electronic order without the removed identity information to the payee identified in the payee information.

2. The method of claim 1, further comprising negotiating an amount of identity information to be removed from the electronic order with the payee.

3. The method of claim 1, wherein the method further comprises retrieving, from the database, information regarding an amount of information to be removed from the electronic order.

4. The method of claim 1, wherein transmitting the electronic order comprises transmitting a payment voucher authorizing payment of the payee.

5. The method of claim 1, further comprising receiving payment for the item or service ordered from the entity placing the electronic order.

6. The method of claim 1, wherein receiving the electronic order comprises receiving information identifying a cell phone.

7. The method of claim 1, further comprising:
receiving an order confirmation from the payee; and
returning the order confirmation to the buyer placing the electronic order.

8. A method comprising:
receiving over a network, from a first party via a first interface with the network, an electronic order for at least one good or service, the electronic order including identity information about the identity of the first party, the electronic order to be placed with a second party, the second party coupled to the network via a second interface;
anonymizing the electronic order using an anonymizer means comprising a processing means and a database for holding identify information of the first party, and transmitting the anonymized electronic order to the second party, wherein anonymizing comprises removing at least a portion of identity information about the first party before transmitting the anonymized electronic order; and
transmitting a voucher for payment for the at least one good or service to the second party.

9. The method of claim 8, further comprising transmitting selected identity information to the second party if transmission of the selected identity information is authorized by the first party.

10. The method of claim 8, wherein anonymizing the electronic order comprises:
retrieving, from the database, information concerning the first party; and
selecting information about the first party for transmission to the second party based on the retrieved information.

11. The method of claim 10, wherein retrieving information from the database comprises retrieving directives describing information to be withheld from the second party.

12. The method of claim 8, wherein receiving the electronic order comprises receiving the electronic order from a subscriber identity module.

13. An article comprising one or more non-transitory computer-readable media which store computer-executable instructions for receiving and transmitting information, the instructions operable to cause a machine to perform operations, the operation comprising:
receiving over a network, from a first party via a first interface with the network, an electronic order for at least one good or service, the electronic order including identity information about the identity of the first party, the electronic order to be placed with a second party, the second party coupled to the network via a second interface;
anonymizing the electronic order using an anonymizer means comprising a processing means and a database for holding identify information of the first party, and transmitting the anonymized electronic order to the second party, wherein anonymizing comprises removing at least a portion of identity information about the first party before transmitting the anonymized electronic order; and
transmitting a voucher for payment for the at least one good or service to the second party.

14. The article of claim 13, wherein the operations further comprise transmitting selected identity information to the second party if transmission of the selected identity information is authorized by the first party.

15. The article of claim 13, wherein anonymizing the electronic order comprises:
retrieving, from the database, information concerning the first party; and
selecting information about the first party for transmission to the second party based on the retrieved information.

16. The article of claim 15 wherein retrieving information from the database comprises retrieving directives describing information to be withheld from the second party.

17. The article of claim 13 wherein receiving the electronic order comprises receiving the electronic order from a subscriber identity module.

18. A system comprising:
a processor, coupled to a communication network; and
a database coupled to the processor,
wherein the processor is configured to
receive information about a first party, the first part coupled to the network via a first interface, receive an electronic transactional order from the first party over the network, the electronic transactional order to be placed with a second party, use the database to anonymize said electronic transactional order, wherein anonymizing comprises generating anonymized information from the information received about the first party, and wherein the anonymized information comprises removing some identity information from the information received about the first party, and transmit the anonymized information to the second party, wherein the database includes information about the first party and directives describing the anonymized information to be transmitted to the second party.

19. The system of claim 18 further comprising a communication interface coupled to the processor.

20. The system of claim 19 wherein the processor receives the information about the first party and the electronic transactional order from the first party by way of the communication interface.

21. The system of claim 19 wherein the processor transmits the electronic transactional order to the second party by way of the communication interface.

22. The system of claim 18 wherein the directives describing the anonymized information to be transmitted to the second party include parameters defining the information to be provided in exchange for consideration from the second party.

23. A method comprising:
placing an electronic order over a communication network by an anonymizer means with a second party on behalf of a first party, wherein the first party is coupled to the communication network via a first interface and wherein the second party is coupled to the communication network via a second interface, and wherein the anonymizer means comprises a processing means and a database storing personal information regarding the first party, wherein placing the order includes
negotiating an amount of personal information regarding the first party to be included with the electronic order, wherein less personal information is sent with the electronic order than is stored in the database, and
providing the negotiated amount of identity information to the second party with the electronic order.

24. The method of claim 23, further comprising retrieving, from a database, information regarding the inclusion of identity information in the electronic order.

25. A non-transitory computer readable storage medium having instructions stored thereon, the instructions when executed by a machine, cause the machine to:
receive, by an anonymizer comprising a processing means coupled to a database, over a network, an electronic order to be placed with a payee from a subscriber, the electronic order including
payee information identifying the payee with whom the electronic order is to be placed and
order information describing at least one item or at least one service ordered;
retrieve subscriber information from the database, the subscriber information including information about the desired anonymity of the subscriber; and
enable placement of the electronic order to the payee without providing the payee any of the desired anonymity information of the subscriber.

26. The medium of claim 25, wherein the subscriber information includes payment and shipping information.

27. The medium of claim 25, wherein the subscriber's desired anonymity comprises a credit card number of the subscriber.

28. The medium of claim 25, wherein the anonymity information varies based on at least one of a good or service associated with the electronic order or the payee.

* * * * *